United States Patent
Goriesky et al.

(10) Patent No.: US 11,351,998 B2
(45) Date of Patent: Jun. 7, 2022

(54) SYSTEMS AND METHODS FOR ADAPTING ACTIVATION OF ALERTS ACCORDING TO CURVATURE OF A TARGET PATH

(71) Applicant: DENSO CORPORATION, Kariya (JP)

(72) Inventors: Joshua Goriesky, Plymouth, MI (US); Nathaniel Sherrit, Southfield, MI (US); Ryo Takaki, Southfield, MI (US)

(73) Assignee: DENSO CORPORATION, Kariya (JP)

( * ) Notice: Subject to any disclaimer, the term of this patent is extended or adjusted under 35 U.S.C. 154(b) by 82 days.

(21) Appl. No.: 16/822,105

(22) Filed: Mar. 18, 2020

(65) Prior Publication Data

US 2021/0291825 A1    Sep. 23, 2021

(51) Int. Cl.
*B60W 30/095* (2012.01)
*B60W 60/00* (2020.01)
*B60W 30/085* (2012.01)
*G06V 20/58* (2022.01)

(52) U.S. Cl.
CPC ...... *B60W 30/0956* (2013.01); *B60W 30/085* (2013.01); *B60W 60/0011* (2020.02); *B60W 60/0016* (2020.02); *G06V 20/58* (2022.01)

(58) Field of Classification Search
CPC ........ B60Q 9/008; B60Q 1/525; B60Q 5/006; G06K 9/00805; G06K 9/00791; B60R 21/0134; B60W 30/09; B60W 30/095; B60W 30/0953; B60W 30/0956; B60T 2201/024
See application file for complete search history.

(56) References Cited

U.S. PATENT DOCUMENTS

| | | | |
|---|---|---|---|
| 6,381,536 B1 | 4/2002 | Satoh et al. | |
| 6,542,111 B1 | 4/2003 | Wilson | |
| 9,487,139 B1 * | 11/2016 | Ishida | B60W 30/08 |
| 9,511,730 B1 | 12/2016 | Wu et al. | |
| 9,650,026 B2 | 5/2017 | Zeng et al. | |
| 9,805,601 B1 * | 10/2017 | Fields | H04W 4/44 |
| 10,000,172 B2 | 6/2018 | Gurghian et al. | |
| 10,086,833 B1 | 10/2018 | Duan et al. | |
| 10,183,640 B2 | 1/2019 | Rhode et al. | |
| 2007/0057780 A1 | 3/2007 | Bridges et al. | |
| 2007/0188312 A1 * | 8/2007 | Bihler | B60R 21/0134 340/435 |

(Continued)

FOREIGN PATENT DOCUMENTS

| | | |
|---|---|---|
| JP | 2008308036 A | 12/2008 |
| JP | 2016045838 A | 4/2016 |
| JP | 2018008576 A | 1/2018 |

*Primary Examiner* — Ryan Rink
(74) *Attorney, Agent, or Firm* — Christopher G. Darrow; Darrow Mustafa PC (57) ABSTRACT

System, methods, and other embodiments described herein relate to improving alerts to a passenger about hazards when exiting a subject vehicle. In one embodiment, a method includes, in response to identifying a target in a surrounding environment of the subject vehicle, estimating a target path of the target. The method includes selectively adjusting an activation threshold for providing an alert according to a curvature of the target path. The method includes activating the alert to inform the passenger of a hazard associated with the target according to whether the target path satisfies the activation threshold.

20 Claims, 6 Drawing Sheets

(56) References Cited

U.S. PATENT DOCUMENTS

| | | | |
|---|---|---|---|
| 2009/0033477 A1* | 2/2009 | Illium | B60R 21/0152 |
| | | | 340/436 |
| 2012/0323478 A1 | 12/2012 | Skogsstjama et al. | |
| 2013/0116859 A1* | 5/2013 | Ihlenburg | B60W 10/18 |
| | | | 701/2 |
| 2013/0234844 A1 | 9/2013 | Yopp | |
| 2014/0257630 A1 | 9/2014 | Ruiz et al. | |
| 2016/0207448 A1 | 7/2016 | Badillo | |
| 2016/0300473 A1* | 10/2016 | Chen | G08B 21/24 |
| 2016/0371980 A1 | 12/2016 | Ignaczak et al. | |
| 2017/0320500 A1* | 11/2017 | Yoo | B60W 30/18163 |
| 2018/0151077 A1 | 5/2018 | Lee | |
| 2019/0017299 A1* | 1/2019 | Capalau | E05B 81/12 |
| 2019/0019412 A1* | 1/2019 | Roca | B60W 30/08 |
| 2019/0024430 A1* | 1/2019 | Jeromin | G06K 9/00805 |
| 2019/0056749 A1 | 2/2019 | Daebum et al. | |
| 2019/0135278 A1* | 5/2019 | Hillman | B60W 30/18036 |
| 2019/0139411 A1 | 5/2019 | Dhull et al. | |
| 2019/0243370 A1* | 8/2019 | Li | B60W 30/08 |
| 2020/0023842 A1* | 1/2020 | Gutierrez | G06K 9/00805 |
| 2020/0070725 A1* | 3/2020 | Ding | B60W 50/16 |
| 2020/0255002 A1* | 8/2020 | Chen | G08G 1/166 |
| 2021/0180373 A1* | 6/2021 | Goriesky | B60Q 9/008 |

* cited by examiner

SYSTEMS AND METHODS FOR ADAPTING ACTIVATION OF ALERTS ACCORDING TO CURVATURE OF A TARGET PATH

TECHNICAL FIELD

The subject matter described herein relates in general to systems and methods for providing warnings to occupants of a vehicle and, more particularly, to adjusting activation thresholds for alerts according to a curvature of a path for a detected target.

BACKGROUND

Vehicles may employ various safety systems to protect passengers, such as airbags, active/passive restraints, automated control assistance (e.g., anti-lock braking systems (ABS)), and so on. While these systems improve the safety of the passengers, they do not generally function to improve the safety of the passengers from external hazards. That is, the noted systems facilitate preventing crashes and/or protecting passengers against injury while underway in the vehicle, but do not help the passenger when, for example, exiting the vehicle.

Thus, the passenger is generally left to their own intuition when exiting from the vehicle in relation to potential hazards that exist around the vehicle. Moreover, while some systems may provide warnings to passengers about nearby vehicles, such systems fail to account for various latent or delayed hazards. For example, various systems may issue alerts upon sensing a nearby vehicle that has an instantaneous heading projecting into an activation zone. However, the noted systems fail to account for occurrences of complex trajectories, such as curving trajectories that may curve away from or toward a subject vehicle. In the noted cases, the system may falsely indicate a hazard when the target is actually turning away or may fail to detect the hazard when the initial heading is not directed toward the activation zone. As such, there is generally a need to better account for complex trajectories in order to accurately inform the passenger and improve the safety of the passenger when exiting the vehicle.

SUMMARY

In one embodiment, example systems and methods associated with improving alerts to a passenger about hazards when exiting a subject vehicle are disclosed. As previously noted, external hazards such as closely passing vehicles may be difficult for a passenger to identify when exiting a vehicle. Even more problematic can be a circumstance in which a system incorrectly activates an alert or fails to activate an alert for a hazard. For example, in instances where a target (e.g., vehicle, motorcycle, bicycle, etc.) has an instantaneous heading that appears to satisfy an activation threshold for activating an alert but is actually turning away from the subject vehicle, an alert may be erroneously activated because the system does not consider a curvature of the path. Additionally, in instances where an instantaneous heading of the target projects a target path that is away from the subject vehicle, but the target is actually turning toward the subject vehicle, an alert may not be activated with adequate timing.

Therefore, in one approach, a disclosed system improves the safety of a passenger by determining when a target path of a nearby target is curved and selectively adjusts activation of alerts according to the curvature. For example, in one embodiment, the disclosed system initially identifies the presence of a target in a surrounding environment of a subject vehicle. The target may include any type of dynamic object that may represent a hazard to a passenger exiting the vehicle. Thus, the target may be another vehicle, a motorcycle, a bicycle, a pedestrian (e.g., runners), etc. From observed information about the target such as position and velocity, the disclosed system may determine a target path (i.e., an estimate of a future path) for the target. Thus, if the curvature of the target path satisfies a defined radius, then the target path is considered to be curved, and the system may then adjust activation thresholds that define circumstances for activating an alert.

For example, in one approach, the system extends a threshold for a time-to-collision (TTC) value that defines a time prior to the target entering an activation zone that the alert is activated in order to provide earlier notification about a potentially less recognizable approaching hazard resulting from the curvature of the target path. In a further aspect, the system increases an area or extent of the activation zone to account for the curved target path. That is, because a curved path may arc toward the subject vehicle, increasing the activation zone can facilitate identifying a target that may pass dangerously close to an area into which a passenger may exit the vehicle. In this way, the disclosed approach functions to improve the safety of the passenger by adapting activation thresholds according to curved target paths in order to better facilitate the activation of alerts.

In one embodiment, a warning system for improving alerts to a passenger about hazards when exiting a subject vehicle is disclosed. The warning system includes one or more processors and a memory that is communicably coupled to the one or more processors. The memory stores a detection module including instructions that, when executed by the one or more processors, cause the one or more processors to, in response to identifying a target in a surrounding environment of the subject vehicle, estimate a target path of the target. The detection module includes instructions to selectively adjust an activation threshold for providing an alert according to a curvature of the target path. The memory stores an alert module including instructions that when executed by the one or more processors cause the one or more processors to activate the alert to inform the passenger of a hazard associated with the target according to whether the target path satisfies the activation threshold.

In one embodiment, a non-transitory computer-readable medium for improving alerts to a passenger about hazards when exiting a subject vehicle is disclosed. The computer-readable medium stores instructions that, when executed by one or more processors, cause the one or more processors to perform the disclosed functions. The instructions include instructions to, in response to identifying a target in a surrounding environment of the subject vehicle, estimate a target path of the target. The instructions include instructions to selectively adjust an activation threshold for providing an alert according to a curvature of the target path. The instructions include instructions to activate the alert to inform the passenger of a hazard associated with the target according to whether the target path satisfies the activation threshold.

In one embodiment, a method of improving alerts to a passenger about hazards when exiting a subject vehicle is disclosed. The method includes, in response to identifying a target in a surrounding environment of the subject vehicle, estimating a target path of the target. The method includes selectively adjusting an activation threshold for providing an alert according to a curvature of the target path. The method includes activating the alert to inform the passenger of a hazard associated with the target according to whether the target path satisfies the activation threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving alerts to a passenger about hazards when exiting a subject vehicle are disclosed. As previously noted, external hazards such as closely passing vehicles may be difficult for a passenger to identify when exiting a vehicle. Moreover, circumstances where an alert system incorrectly activates an alert or fails to activate an alert for a hazard can represent further difficulties that may diminish trust in the alerting system thereby diminishing safety overall. For example, in instances where a target (e.g., vehicle, motor-cycle, bicycle, etc.) has an instantaneous heading that satisfies an activation threshold (i.e., crosses an activation zone), but is actually turning away from the subject vehicle or has a target path that is directed away from the subject vehicle but is turning toward the subject vehicle, an alert may not be activated in a correct manner (e.g., activated late or incorrectly activated).

Therefore, in one approach, the disclosed system improves the safety of a passenger by adapting the delivery of alerts for target paths that are curved. For example, in one embodiment, the disclosed system acquires sensor data about a surrounding environment and identifies the presence of a target relative to a subject vehicle from the sensor data. The target may include any dynamic object that may represent a hazard to a passenger exiting the vehicle. Thus, the target may be another vehicle, a motorcycle, a bicycle, a pedestrian (e.g., runners), etc. From observations of the sensor data about the target, the disclosed system may determine a target path for the target over a defined prediction horizon. The target path includes information about a curvature, such as a defined radius that is extrapolated from a rate of turn. Accordingly, the system may use the defined radius to assess whether the target path includes sufficient curvature to justify adjusting activation thresholds that define circumstances for activating an alert.

The system may adjust the activation thresholds in different ways depending on various circumstances. For example, in one approach, the system extends a time-to-collision (TTC) that defines a time prior to the target entering an activation zone that the alert is activated. Extending the TTC can provide earlier notification about a potentially less recognizable approaching hazard due to the curvature of the target path. In a further aspect, the system increases an area or extent of the activation zone to account for the curved target path. That is, because a curved path may arc toward the subject vehicle, increasing the activation zone can facilitate identifying a target that may pass dangerously close to an area into which a passenger may exit the vehicle. In this way, the disclosed approach functions to improve the safety of the passenger by adapting activation thresholds according to curved target paths in order to better facilitate activation of alerts Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport that, for example, transports passengers, and thus benefits the functionality discussed herein.

The vehicle 100 also includes various elements. It will be understood that in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Figure 1:
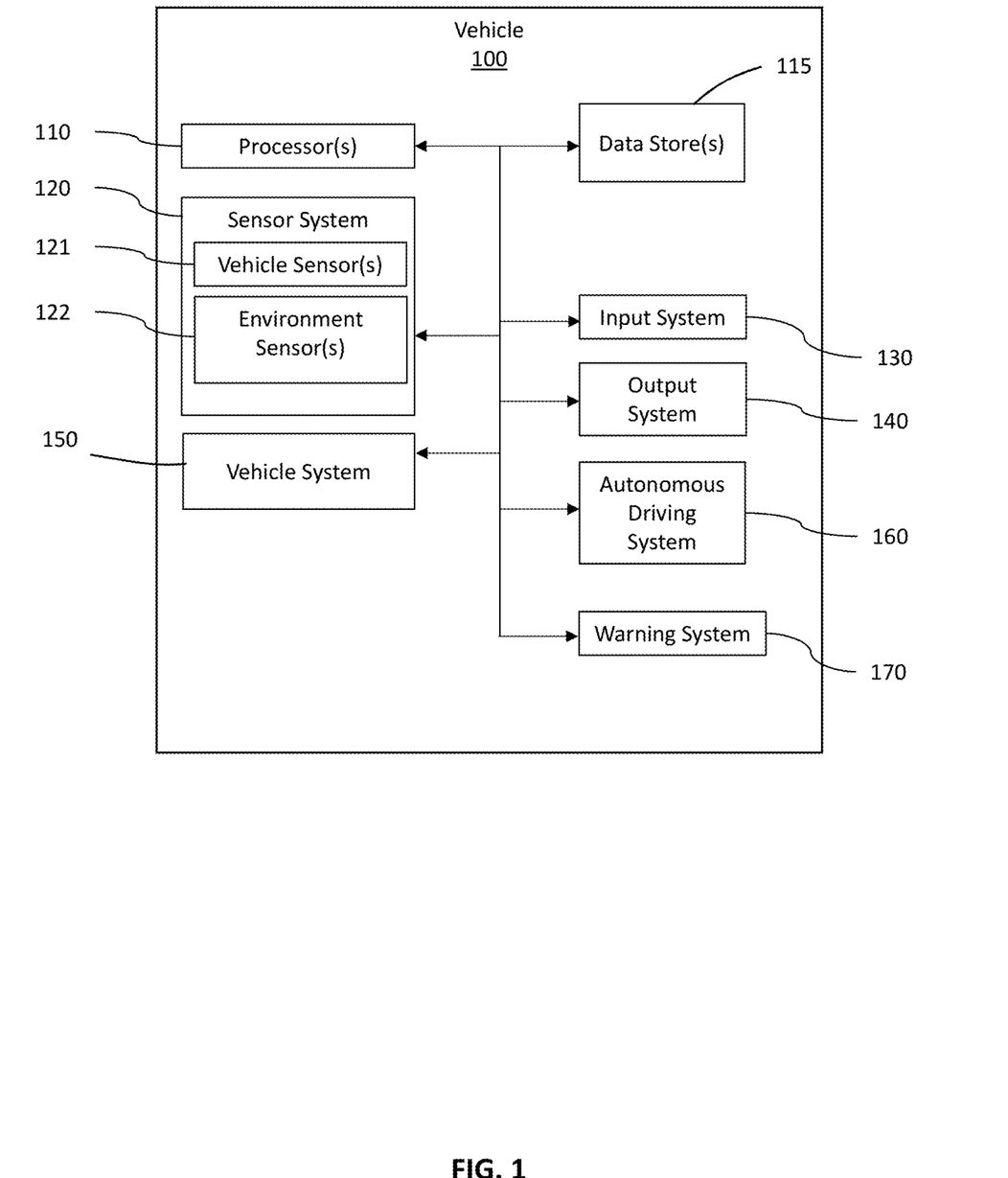
FIG. 1 illustrates one embodiment of a configuration for a vehicle in which example systems and methods disclosed herein may operate.

Some of the possible elements of the vehicle 100 are shown in FIG. 1 and will be described along with subsequent figures. A description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 (also referred to as the subject vehicle herein) includes a warning system 170 that functions to improve the safety of passengers of the vehicle 100. Moreover, while depicted as a standalone component, in one or more embodiments, the warning system 170 is integrated with the autonomous driving system 160 (e.g., when present), or another component of the vehicle 100. The noted functions and methods will become more apparent with a further discussion of the figures.

Figure 2:
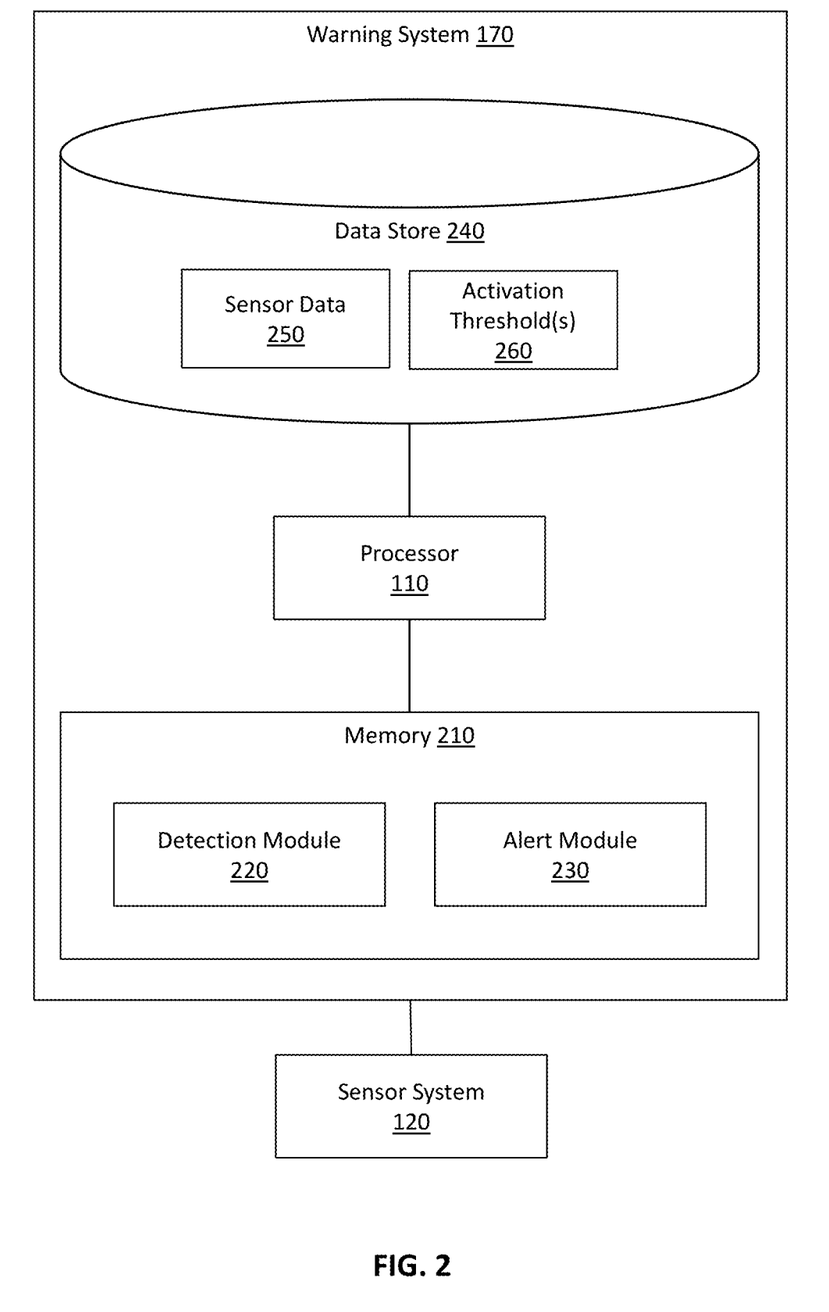
FIG. 2 illustrates one embodiment of a warning system that is associated with alerting a passenger about hazards when exiting a subject vehicle.

With reference to FIG. 2, one embodiment of the warning system 170 is further illustrated. As shown, the warning system 170 includes a processor 110. Accordingly, the processor 110 may be a part of the warning system 170, or the warning system 170 may access the processor 110 through a data bus or another communication pathway. In one or more embodiments, the processor 110 is an application-specific integrated circuit that is configured to implement functions associated with a detection module 220 and an alert module 230. More generally, in one or more aspects, the processor 110 is an electronic processor, such as a microprocessor that is capable of performing various functions as described herein when loading the noted modules and executing encoded functions associated therewith.

In one embodiment, the warning system 170 includes a memory 210 that stores the detection module 220 and the alert module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware, such as processing components (e.g., controllers), circuits, etc. for independently performing one or more of the noted functions.

Furthermore, in one embodiment, the warning system 170 includes a data store 240. The data store 240 is, in one embodiment, an electronically-based data structure for storing information. In at least one approach, the data store 240 is a database that is stored in the memory 210 or another suitable medium, and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes sensor data 250, and activation threshold(s) 260 (e.g., activation zone, timing thresholds, defined radius, etc.) along with, for example, other information that is used by and/or produced by the modules 220 and 230.

Accordingly, the detection module 220 generally includes instructions that function to control the processor 110 to acquire data inputs from one or more sensors (e.g., the sensor system 120) of the vehicle 100 that form the sensor data 250. In general, the sensor data 250 includes information that embodies observations of the surrounding environment of the vehicle 100. The observations of the surrounding environment, in various embodiments, can include surrounding lanes, targets (e.g., dynamic objects), static objects, obstacles, and other aspects of the environment that may be present in lanes, proximate to a roadway, within a parking lot, garage structure, driveway, or another area within which the vehicle 100 is traveling and/or parked.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors, from a wireless communication link (e.g., v2v) with one or more surrounding vehicles, and/or from one or more infrastructure-based sensors (e.g., vehicle-to-infrastructure). Thus, the sensor data 250, in one embodiment, represents a combination of perceptions acquired from multiple sensors and/or sources.

In addition to locations of surrounding targets, the sensor data 250 may also include, for example, information about lane markings, velocities of surrounding targets, positions, and so on. Moreover, the detection module 220, in one embodiment, controls the sensors to acquire the sensor data 250 about an area that encompasses 360 degrees about the vehicle 100 in order to provide a comprehensive assessment of the surrounding environment. Accordingly, the sensor data 250 may include varying forms of observations about the surrounding environment that the detection module 220 derives from a single type of sensor (e.g., a radar sensor) or that the detection module 220 derives from fusing sensor data from multiple sources (e.g., mono-camera, stereo camera, LiDAR, radar, ultrasonic, etc.). In any case, the sensor data 250 provides observations of the surrounding environment to support the detection, identification, and localization of the targets, and, in at least one embodiment, aspects of the environment that may influence paths/trajectories of the targets.

Thus, the detection module 220 processes the sensor data 250 to detect the surrounding objects and track particular ones of the objects as targets (e.g., objects traveling in a lane adjacent to the vehicle 100). As previously noted, the targets include dynamic objects, such as various types of vehicular objects (e.g., automobiles, trucks, motorcycles, etc.), non-vehicular objects (e.g., pedestrians, animals, bicycles, etc.), etc. Whichever objects makeup the detected targets, the warning system 170 generally functions to determine hazards to a passenger that may exit via one of the doors of the vehicle 100 and provide the alerts for the hazards.

Moreover, while the present disclosure generally describes the warning system 170 within the context of detecting a single target, and providing the alert in relation to the target, it should be appreciated that the warning system 170 may detect and provide alerts for any number of targets in a surrounding environment. For example, in various examples, the warning system 170 may detect two, three, four, or more targets, including vehicles and other types of dynamic objects.

In any case, the detection module 220, as noted, generally functions to detect a target and determine the characteristics of the targets from the sensor data 250. The characteristics generally include at least a current position relative to the vehicle 100, and a velocity (i.e., speed and direction). Moreover, the detection module 220 may acquire the characteristics as separate observations over a period of time to provide an adequate basis from which to determine a rate of turn, and, thus, a radius for the turn. For example, to determine the rate of turn, the detection module 220 uses multiple observations prior observations (e.g., over three or more prior time steps). In general, each of the observations include the noted information about position and velocity. Accordingly, while the detection module 220 can extrapolate a single observation to provide an instantaneous path, the single observation does not generally include adequate information to determine whether the target is moving along a curve. Instead, the instantaneous path is a linear path that uses the instantaneous heading and velocity to provide a forward prediction of position relative to the subject vehicle 100. By contrast, using multiple separate observations permits the detection module 220 to estimate a more complex path for the target that can include curves. For example, the detection module 220, in one approach, uses polynomial extrapolation with the prior observations as inputs to determine a curve that fits the observation points. In further approaches, the detection module 220 may use a comparative approach to determine differences in position that correspond to a rate of turn from which a radius of a curve is identified.

In any case, the detection module 220 generally uses the position and velocity information about the target to predict a target path from which the alert module 230 can generate a determination about whether the targets are hazards or not according to the activation threshold 260. Accordingly, the detection module 220 functions to detect and determine characteristics of the surrounding objects (e.g., targets) so that the alert module 230 can determine which of the objects represent hazards that are identified as targets and are tracked accordingly. As noted, in various aspects, the detection module 220 may generate separate observations (e.g., positions and/or trajectories) about the targets that the detection module 220 provides to the alert module 230 for further analysis.

Additionally, the detection module 220, in one or more embodiments, includes instructions to selectively adjust the activation threshold 260 to account for the curvature of the target path. As previously noted, the detection module 220 can compute the target path according to multiple observations of a target. Moreover, the detection module 220 may undertake separate approaches to adjusting the activation threshold 260 or components thereof. For example, the detection module 220 may undertake a traditional approach of initially determining the target path as an instantaneous path according to an instantaneous heading and position of the target. Subsequently, when the alert module 230 determines that the instantaneous path crosses an activation zone (e.g., within a defined distance of a crossing line of the vehicle 100), the detection module 220 can undertake a further analysis to compute the target path according to multiple observations and determine whether the target path includes any curvature. If the target path does curve, the detection module 220, in one aspect, may adapt the activation threshold 260 accordingly.

Alternatively, in a further approach, the detection module 220 initially determines the target path as a complex trajectory including any curvature to the target path. Thus, according to the curvature, the detection module 220 can selectively adjust the activation threshold 260. In one embodiment, the detection module 220 compares a radius of the curvature with a defined radius to analyze whether the curvature is sufficient for adjusting the activation threshold 260. For example, the defined radius specifies a boundary beyond which the target path is considered to be curving. As one example, the defined radius may be 100 meters or may be specified as degrees of turn (e.g., >5 degrees) relative to a substantially perpendicular/longitudinally linear trajectory. In any case, the detection module compares the defined curvature with the curvature of the target path to determine whether the target path should be characterized as curving.

When the detection module 220 determines that the target path satisfies the defined radius, the detection module 220, in one embodiment, adjusts the activation threshold 260. It should be appreciated that the activation threshold 260 may include multiple different components that the detection module 220 can adjust independently or in combination. In either case, the activation threshold 260 includes at least an activation zone and a timing threshold. The activation zone, in one approach, defines a region around the vehicle 100, such as a bounding box that defines a minimum distance/offset between the vehicle 100 and a passing target. The activation zone generally identifies a minimum clearance for a passenger to exit the vehicle 100 safely. Thus, the activation zone may be defined according to physical characteristics of the vehicle 100, such as a door spanning distance for an open door, and/or according to situational characteristics, such as a condition/type of passenger (e.g., child, elderly, etc.). In a further aspect, the activation zone may be defined according to a crossing line at the rear of the vehicle that defines a lateral crossing point away from the vehicle as the activation zone.

The timing threshold is defined according to a time-to-collision (TTC) for the target crossing the activation zone. Thus, the timing threshold may be defined according to an amount of time for adequately informing the passenger of an approaching threat, which is, in one embodiment, three seconds. Accordingly, the detection module 220, upon determining that the target path is curving, can adjust the activation threshold to better account for the curvature. For example, in one approach, the detection module 220 increases a time-to-collision (TTC) value for the timing threshold at which the alert is to be activated. The intuition for increasing the TTC is that a curved path approaching the vehicle is less apparent, and, thus, the passenger should be afforded additional warning time to avoid such a hazard. Moreover, the detection module 220 may separately or together with adjusting the timing threshold also adjust the activation zone. For example, in one approach, the detection module 220 extends the activation zone to an increased range. Extending the activation zone helps to capture hazards that may otherwise go unnoticed since the hazards may have paths that cross outside of the activation zone but quickly move into close proximity of the vehicle 100.

Figure 3:
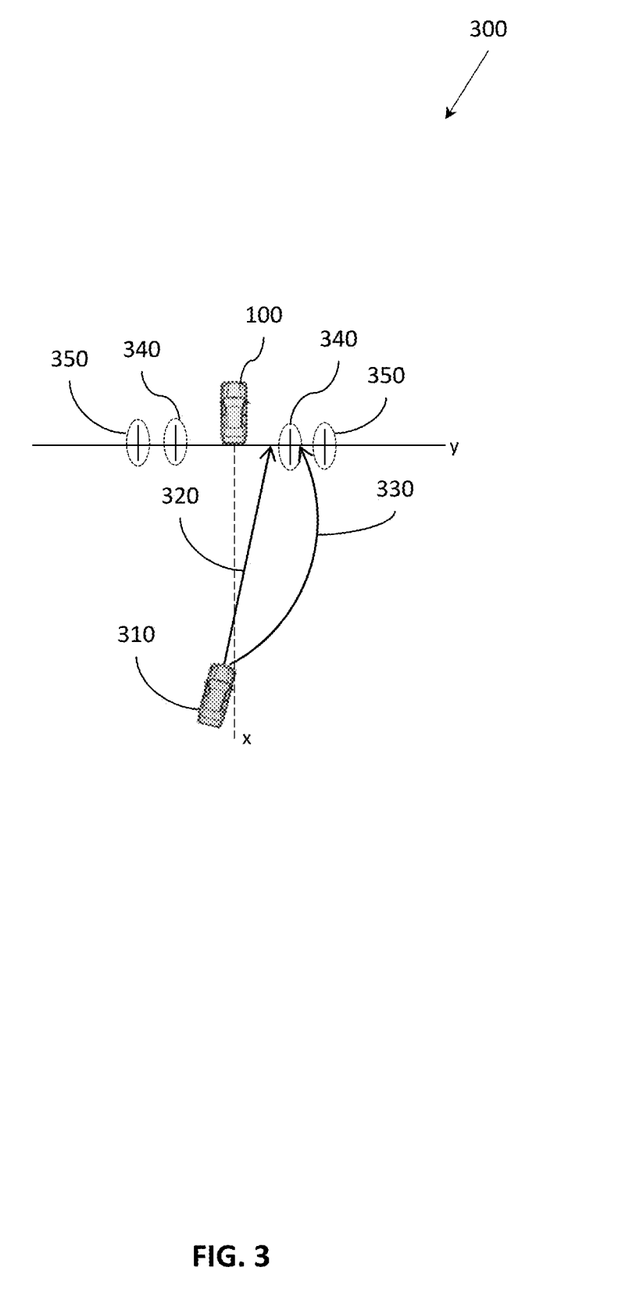
FIG. 3 is a diagram illustrating an example of adjusting an activation zone for a curved target path.

By way of example, FIG. 3 illustrates a diagram 300 of one configuration in which a curving path may not trigger an alert but still represents a potential hazard. As illustrated, FIG. 3 includes the subject vehicle 100 and an approaching target 310. The diagram 300 further illustrates two separate paths 320 and 330 for the target 310. The path 320 illustrates an instantaneous path according to a single current observation of the target 310, whereas the path 330 illustrates a complex path derived from multiple observations. The diagram 300 further illustrates activation zones 340 and 350 along the rear crossing line of the vehicle 100. Thus, activation zone 340 defines a region to either side of the vehicle 100 within which the warning system 170 may activate an alert for a target path that crosses between the vehicle 100 and the endpoint of the zone.

As illustrated, the curving path 330 would not activate the alert, whereas the path 320 crosses inside of the zone 340 and would. However, as shown in the diagram 300, the path 320 is directed away from the vehicle 100 whereas the path 330 is curving back toward the vehicle 100. Thus, even though the path 320 is potentially a lesser threat to an exiting passenger in contrast to the path 330, the warning system 170 would fail to activate an alert for the path 330. Thus, in one approach, the detection module 220, in response to determining that the path 330 is curved as defined in relation to the defined radius, adjusts the activation zone from 340 to 350 in order to expand a region for which the warning system 170 activates alerts. In this way, the warning system 170 improves how alerts are activated to better capture different circumstances that may be hazardous to an exiting passenger.

Figure 4A:
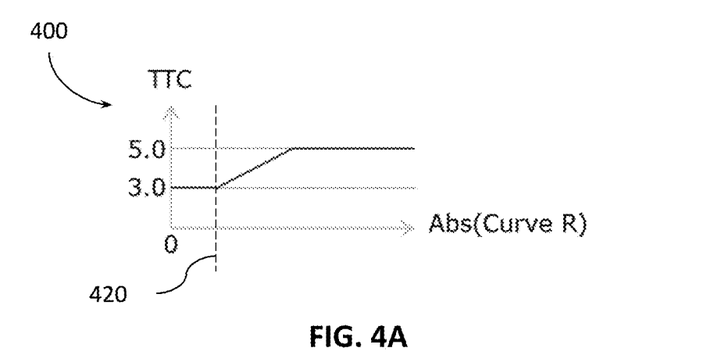
FIGS. 4A and 4B illustrate graphs of separate components of an activation threshold and changes to the activation threshold according to curvature of a path.
Figure 4B:
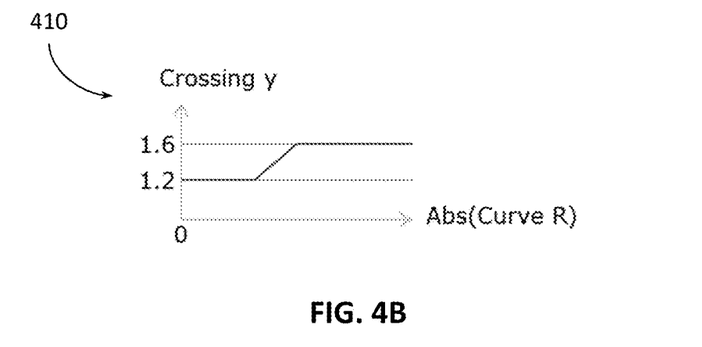

As a further example, consider FIGS. 4A and 4B, which illustrate graphs 400 and 410 associated with modifying the activation threshold 260. The graph 400 illustrates how the detection module 220 can adjust the timing threshold according to the TTC as the target path begins to curve. As shown, once the curvature of the target path reaches a defined radius 420, the detection module 220 can begin to increase the timing threshold until the curvature reaches an upper limit, at which point the timing threshold is extended to a maximum value (e.g., 5 seconds). The graph 410 illustrates adjustments to the activation zone as the curvature of the target path increases. As illustrated, the detection module 220 increases the activation zone from 1.2 meters to 1.6 meters as the curvature of the path increases. It should be appreciated that while specific examples are given for the separate thresholds, in various embodiments, the thresholds may be selected according to specific aspects of the implementation that vary beyond the examples shown.

With continued reference to FIG. 2, in one embodiment, the alert module 230 generally includes instructions that function to control the processor 110 to determine when targets constitute hazards and to activate alerts accordingly. By way of example, consider an occurrence of the detection module 220 detecting a target approaching the vehicle 100. The alert module 230 uses the target path derived by the detection module 220 to determine whether the target constitutes a hazard to a passenger that may exit the vehicle 100. In one embodiment, the alert module 230 iteratively compares the target path with the activation threshold 260 to determine whether the target is predicted to satisfy the activation threshold (i.e., cross into the activation zone) and when to activate the alert (i.e., whether the TTC of the target satisfies the timing threshold).

In one embodiment, the alert module 230 may determine whether the target path satisfies the activation threshold in relation to a particular door or side of the vehicle 100. That is, as a further aspect, in one approach, the alert module 230 monitors the doors of the vehicle 100 to determine which door is potentially associated with an exiting passenger and compares the target path with the activation threshold in relation to a corresponding side of the vehicle 100 for the door. In one aspect, the sensor data 250 can further include information about an interior of the vehicle 100, such as, seat occupancy sensors, door sensors, seat belt sensors, and other information that provides insights about which door a passenger is likely to exit.

Thus, in one embodiment, when the warning system 170 detects that the vehicle 100 stops, and that a seat belt is unbuckled and/or a door handle is activated, the alert module 230 then generates an alert for a corresponding side/door of the vehicle 100, if conditions for providing an alert are met (e.g., a target is within the activation threshold). In a further aspect, the alert module 230 may provide an alert whenever a hazard is present, and the vehicle 100 is stopped without consideration to aspects relating specifically to the passenger (e.g., seat belt sensor, etc.). It should be appreciated that such an alert is generally not delivered when the vehicle 100 is in motion, although, in various embodiments, a similar mechanism may be employed for collision avoidance detection.

In any case, the alert module 230, in one approach, determines whether a target satisfies the activation threshold 260. In one or more approaches, the alert module 230 generates the alert itself in different forms when the activation threshold 260 is satisfied. In one embodiment, the alert module 230 generates the alert as an audible indicator (i.e., a sound). In further approaches, the alert module 230 generates the alert as a visual indicator (e.g., a warning light positioned near or on doors of the vehicle 100). In yet further approaches, the alert module 230 may generate haptic feedback, lock a door, or perform other functions to provide the alert. Moreover, the alert module 230 can combine one or more different forms of the alert together, and/or generate the alert, for example, only upon sensing that a passenger is about to exit the vehicle 100 (e.g., from seat belt sensors, door sensors, etc.).

Additionally, the alert module 230 may adapt a form of the alert itself. For example, the activation threshold 260 indicates a time for which the alert remains active (e.g., a time that a light is on or a sound is played) that generally corresponds with the TTC value for the timing threshold. The alert module 230 may adapt an intensity (e.g., brightness, sound level, etc.) as a hazard nears. In this way, the warning system 170 functions to selectively adjust thresholds and activate alerts according to the thresholds in order to improve safety for passengers exiting the vehicle 100 regardless of a particular form of the target path itself.

Figure 5:
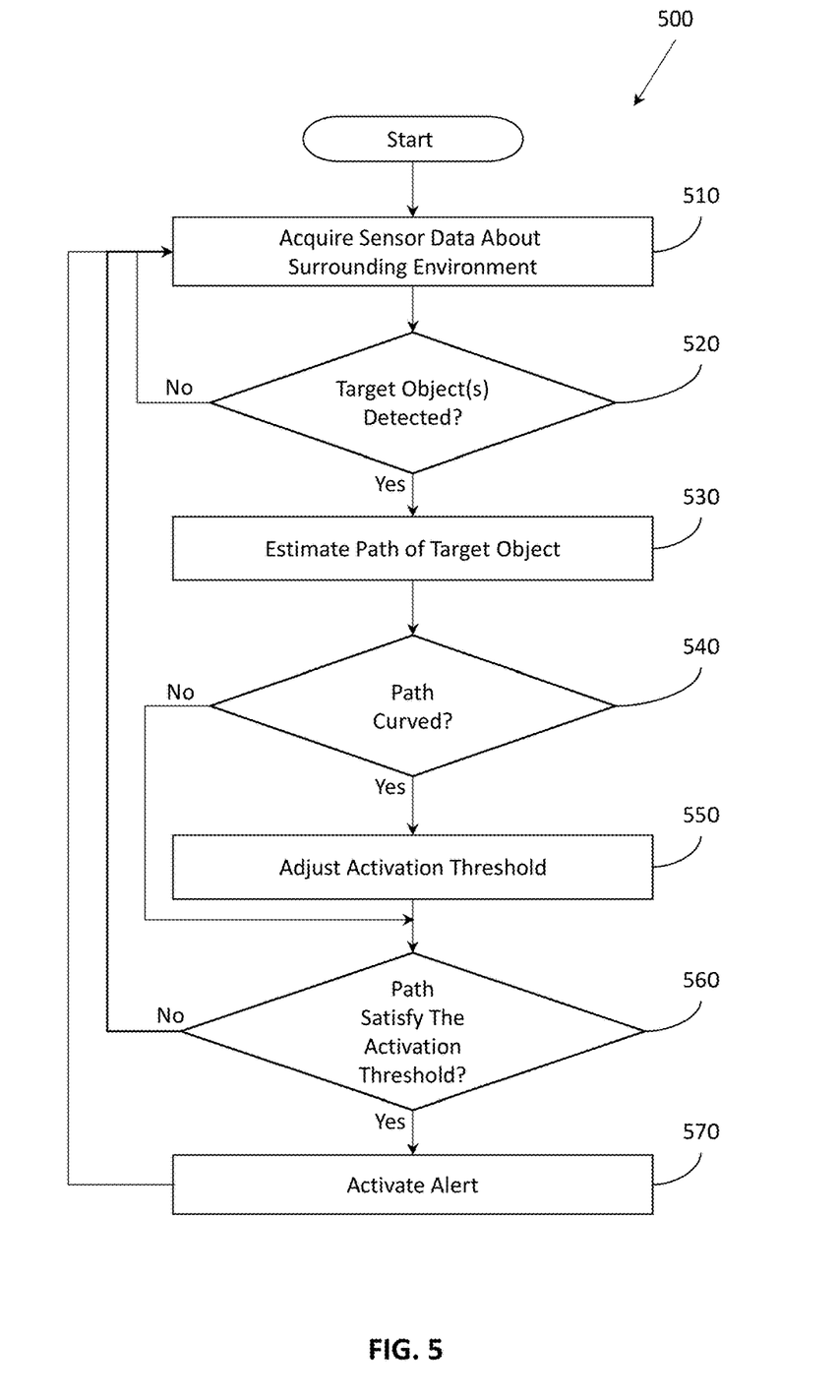
FIG. 5 illustrates one embodiment of a method associated with selectively adjusting an activation threshold.

Additional aspects of providing warnings to passengers about exiting a vehicle will be discussed in relation to FIG. 5. FIG. 5 illustrates a method 500 associated with selectively adjusting activation thresholds according to whether a path for a detected target is curved or linear. Method 500 will be discussed from the perspective of the warning system 170 of FIG. 1. While method 500 is discussed in combination with the warning system 170, it should be appreciated that the method 500 is not limited to being implemented within the warning system 170 but is instead one example of a system that may implement the method 500.

At 510, the detection module 220 acquires sensor data 250 about the surrounding environment. In one embodiment, the detection module 220 iteratively acquires the sensor data 250 from one or more sensors of the sensor system 120. The sensor data 250 includes observations of a surrounding environment of the subject vehicle 100 that facilitate improving the situational awareness of the vehicle 100 and associated systems about the surroundings so that such information can then be leveraged for further tasks including, for example, semi-autonomous operation, autonomous operation, generating safety alerts, and so on. The sensor data 250 itself may take different forms depending on the source, but generally functions as separate observations of the surrounding environment of the vehicle 100 and may further include information about the vehicle 100 as additional context about the surroundings.

At 520, the detection module 220 analyzes the sensor data 250 using one or more detection/identification routines to detect the presence of objects, classify/identify a type of the objects (e.g., vehicle, pedestrian, etc.), and localize the objects relative to the subject vehicle 100. Thus, as part of detecting the objects (i.e., targets), the detection module 220 can associate separate observations from the sensor data 250 over time in order to track the object and acquire separate data points from which further determinations can be derived. In one or more implementations, the detection module 220 implements machine learning algorithms, such as a convolutional neural network (CNN) to identify/detect objects from the sensor data 250. Moreover, the detection module 220 may implement further routines to perform the localization, such as localization and mapping routines. In any case, the detection module 220 uses the sensor data 250 to acquire an awareness about the surrounding environment and track various dynamic objects (i.e., targets) moving relative to the vehicle 100.

While a single target is described, it should be appreciated that the detection module 220 may detect multiple targets in parallel at 520, which are, for example, each separately tracked through an iterative process, as shown at blocks 510-530. Thus, the warning system 170 generally executes the functions identified at blocks 510-530 for the respective objects. In any case, each object undergoes similar scrutiny while additional considerations are undertaken to determine whether to activate an alert.

At 530, the detection module 220 estimates a target path for the target detected at 520. In one embodiment, the detection module 220 extrapolates the observations according to a polynomial interpolation technique or another mechanism for inferring a future path according to multiple prior observations of the target. As a general characteristic of the noted approach, the process of extrapolating the observations accounts for complex geometries in the target path in order to characterize whether the target path is curved or substantially linear. Moreover, estimating the target path may further include the use of at least three observations of the target from the sensor data 250 to determine a rate of turn for the target from which an inference about a radius of the curvature can be derived.

Of course, while a complex target path is discussed as the initial estimate, in one or more approaches, the estimation may be undertaken as a two-part process. For example, as previously outlined, the warning system 170 may initially use an instantaneous estimate of the target path and subsequently derive a complex estimate about the curvature of the target path as the detection module 220 acquires additional observations. Thus, in such an instance, the instantaneous path may be compared to the activation threshold 260 without any adjustment, and then subsequently adjusted for timing if the target path is identified as curving.

At 540, the detection module 220 analyzes the target path to determine whether the target path is curved. In one embodiment, the detection module 220 compares the radius of the target path with a defined radius that indicates a limit beyond which the target path is considered to include sufficient curvature to be categorized as a curved path. If the target path satisfies the defined radius, then the detection module 220 proceeds to adjust the activation threshold 260 at 550. Otherwise, the detection module 220 skips to block 560.

At 550, the detection module 220 adjusts the activation threshold 260. In one approach, the detection module 220 adjusts the activation threshold 260 by increasing a time-to-collision (TTC) value that specifies when to activate the alert, and/or extending an activation zone that specifies a proximity of the path to the subject vehicle. In general, the process of adjusting the activation threshold 260 is undertaken in order to improve awareness about a target that is following a target path that is not linear and thus may not be observed by a passenger as imminently dangerous when such a path may be dangerous to an exiting passenger. Moreover, further considering complex paths that include non-linear geometries can also facilitate avoiding false positives as outlined further in relation to FIG. 6A.

At 560, the alert module 230 determines whether the target path satisfies the activation threshold. As previously described, the activation threshold is, in one embodiment, defined according to a proximity/distance component (i.e., the activation zone) and a timing component (i.e., the timing threshold/TTC). The activation zone is generally a defined minimum distance for passing next to the vehicle 100. Thus, the activation zone may be defined in different ways depending on the implementation, such as a distance along a rear crossing line of the vehicle 100, a perimeter about the vehicle 100, and so on. This activation zone, also referred to as a safety zone, defines a region proximate to the vehicle 100 within which a passenger exits into when leaving the vehicle 100. Thus, if the alert module 230 determines that the target path satisfies (e.g., breaches, crosses into, intersects, etc.) the activation zone, then the target is considered to be a hazard to the passenger.

Moreover, in addition to simply determining whether the target path satisfies the activation zone, the alert module 230 also determines a timing for when to activate the alert. That is, the alert module 230 compares a time-to-collision (TTC) of the target as identified by the target path with a timing threshold for delivering the alert. Thus, when the TTC (i.e., the time until the target is to pass into the activation zone) of the target satisfies the timing threshold, then the target path then satisfies the activation threshold 260 overall. Accordingly, the warning system 170 then proceeds to activate the alert at 570 when the target path satisfies the activation threshold 260 or, otherwise, continues to monitor the target when the target path does not satisfy the activation threshold 260.

At 570, the alert module 230 activates the alert. In one embodiment, activating the alert occurs when another alert is not already active. That is, if the alert module 230 is not presently generating an alert, then the alert module 230 newly generates an alert at 570. However, if an alert is already being delivered, then the alert module 230 considers how to provide a subsequent alert by, for example, extending an alert or delivery of an additional indicator. As previously described, the alert itself may take many different forms but is generally provided to improve awareness of the passenger about potential threats when exiting the vehicle 100.

Figure 6A:
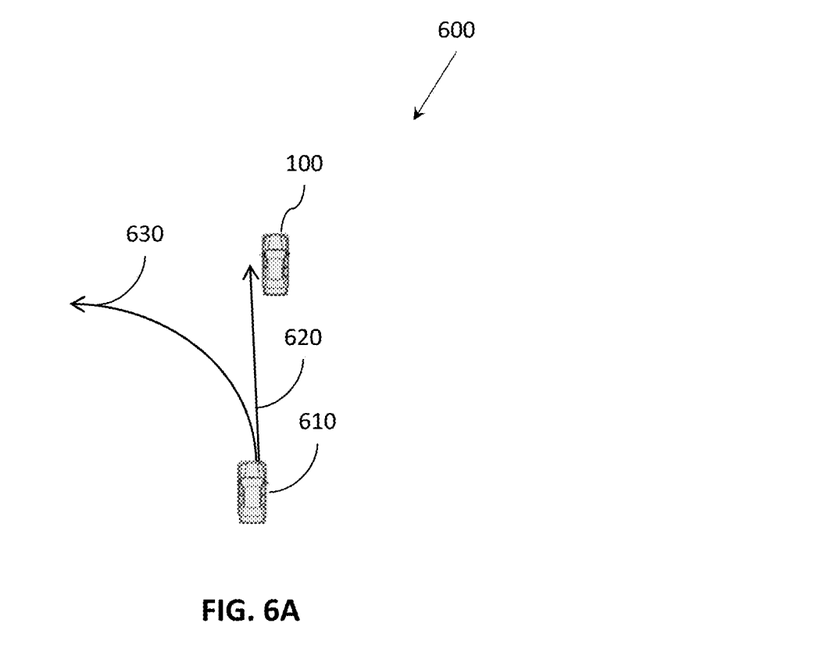
FIGS. 6A and 6B illustrate examples of target paths.

As a further explanation of the warning system 170, consider FIG. 6A, which illustrates one example scenario 600 involving a curved path. The scenario 600 illustrates a target 610 approaching the subject vehicle 100 from behind. Thus, the subject vehicle 100 may be parked along a roadway, in a parking lot, etc. with a passenger about to exit. In any case, the scenario 600 illustrates an instantaneous path 620 and a curved path 630 for the target 610. Thus, the illustrated scenario 600 shows how using the instantaneous path 620 may result in a false positive (i.e., an activation of an alert when unwarranted) since the target 610 is actually turning away from the vehicle 100 as shown by the path 630. Accordingly, the warning system 170 can improve the trust of the passenger in the alerts by avoiding false positives as in the instance of the scenario 600 via computing the target path from multiple observations to better derive complex trajectories.

Figure 6B:
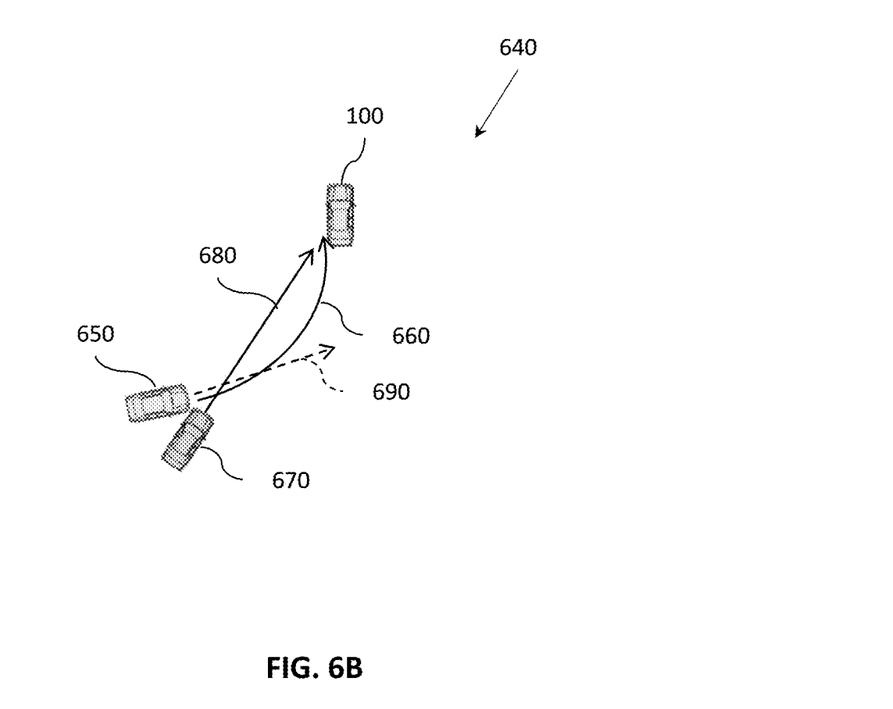

As an additional example, consider FIG. 6B, which illustrates an additional scenario 640. As shown in the scenario 640, the subject vehicle 100 is being approached by a target 650 with a target path 660 and a target 670 with a target path 680. Assuming the speeds for the separate targets are equal, the noted paths 660 and 680 represent different times for the targets to cross into an activation zone of the vehicle 100. Thus, the scenario 640 illustrates the advantage of extending the timing threshold component of the activation threshold 260 for the curved path 660 in order to provide additional alert time to a passenger for a less apparent trajectory that curves. Moreover, in regards to the target 650, specifically, the scenario 640 further illustrates how the warning system 170 avoids false negatives in delivering alerts. That is, if the warning system 170 relied solely on instantaneous paths, then the target 650 would not appear to approach the vehicle 100 as illustrated by instantaneous path 690. Thus, the warning system 170, if relying on the path 690, would not potentially activate an alert for the target 650 until after the target 650 has turned toward the subject vehicle 100, which may not provide an adequate alert time for the passenger. Thus, by considering the complex target path 660, the warning system 170 is better able to predict which targets are hazards, and, thus, is better able to alert passengers.

Additionally, it should be appreciated that the warning system 170 from FIG. 1 can be configured in various arrangements with separate integrated circuits and/or electronic chips. In such embodiments, the detection module 220 is embodied as a separate integrated circuit. Additionally, the alert module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the warning system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

The one or more data stores 115 (e.g., data store 240) can include sensor data (e.g., sensor data 250). In this context, "sensor data" means any information from the sensors that the vehicle 100 is equipped with, including the capabilities and other information about such sensors. As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. The vehicle 100 can include various combinations of systems. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system, or a geolocation system.

The processor(s) 110, the warning system 170, and/or the autonomous driving system 160 can be operatively connected to communicate with the various vehicle systems 150 and/or individual components thereof. For example, returning to FIG. 1, the processor(s) 110 and/or the autonomous driving system 160 can be in communication to send and/or receive information from the various vehicle systems 150 to control the movement, speed, maneuvering, heading, direction, etc. of the vehicle 100. The processor(s) 110, the warning system 170, and/or the autonomous driving system 160 may control some or all of these vehicle systems 150 and, thus, may be partially or fully autonomous.

The processor(s) 110, the warning system 170, and/or the autonomous driving system 160 can be operatively connected to communicate with the various vehicle systems 150 and/or individual components thereof. For example, returning to FIG. 1, the processor(s) 110, the warning system 170, and/or the autonomous driving system 160 can be in communication to send and/or receive information from the various vehicle systems 150 to control the movement, speed, maneuvering, heading, direction, etc. of the vehicle 100. The processor(s) 110, the warning system 170, and/or the autonomous driving system 160 may control some or all of these vehicle systems 150.

The processor(s) 110, the warning system 170, and/or the autonomous driving system 160 may be operable to control the navigation and/or maneuvering of the vehicle 100 by controlling one or more of the vehicle systems 150 and/or components thereof. For instance, when operating in an autonomous mode, the processor(s) 110, the warning system 170, and/or the autonomous driving system 160 can control the direction and/or speed of the vehicle 100. The processor(s) 110, the warning system 170, and/or the autonomous driving system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the warning system 170 and/or the autonomous driving system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the autonomous driving system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, one or more data stores 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the warning system 170 can be configured to determine travel path(s), current autonomous driving maneuvers for the vehicle 100, future autonomous driving maneuvers and/or modifications to current autonomous driving maneuvers based on data acquired by the sensor system 120. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A warning system, comprising:
   one or more processors;
   a memory communicably coupled to the one or more processors and storing:
   a detection module including instructions that when executed by the one or more processors cause the one or more processors to, in response to identifying a target in a surrounding environment of a subject vehicle, estimate a target path of the target, and selectively adjust an activation threshold for providing an alert according to a curvature of the target path; and
   an alert module including instructions that when executed by the one or more processors cause the one or more processors to activate the alert in response to determining a hazard associated with a passenger exiting the subject vehicle into the target path according to whether the target path satisfies the activation threshold.

2. The warning system of claim 1, wherein the detection module includes instructions to selectively adjust the activation threshold including instructions to perform one or more of: increasing a time-to-collision (TTC) value that specifies when to activate the alert, and expanding an activation zone that specifies a proximity of the target path to the subject vehicle.

3. The warning system of claim 1, wherein the detection module includes instructions to selectively adjust the activation threshold including instructions to determine the curvature of the target path and adjusting the activation threshold when the curvature satisfies a defined radius for characterizing the target path as being curved.

4. The warning system of claim 1, wherein the detection module includes instructions to selectively adjust the activation threshold including instructions to determine that an instantaneous component of the target path satisfies an activation zone of the activation threshold and subsequently determine whether the target path includes the curvature in order to assess whether the activation zone is to be extended.

5. The warning system of claim 1, wherein the detection module includes instructions to identify the target including instructions to acquire sensor data about the surrounding environment of the subject vehicle, and identifying the target according to the sensor data, and
   wherein the detection module includes instructions to estimate the target path including instructions to use at least three observations of the target from the sensor data to determine a rate of turn for the target and infer a radius of the curvature.

6. The warning system of claim 1, wherein the target is a moving object in the surrounding environment of the subject vehicle including one or more of: a nearby vehicle, a pedestrian, and a bicycle,
   wherein the detection module includes instructions to estimate the target path including instructions to compute the target path from multiple observations of the vehicle at different points in time.

7. The warning system of claim 1, wherein the alert module includes instructions to activate the alert including instructions to generate the alert as a safe exit alert including at least one of: an audible sound, a visual indicator, haptic feedback, and locking a door of the subject vehicle, and
wherein the detection module includes instructions to selectively adjust the activation threshold to improve a safety of the passenger from exiting the subject vehicle into a path of the target.

8. The warning system of claim 1, wherein the warning system is a safe exit alert (SEA) system.

9. A non-transitory computer-readable medium storing instructions, when executed by one or more processors, cause the one or more processors to:
in response to identifying a target in a surrounding environment of a subject vehicle, estimate a target path of the target;
selectively adjust an activation threshold for providing an alert according to a curvature of the target path; and
activate the alert in response to determining a hazard associated with a passenger exiting the subject vehicle into the target path according to whether the target path satisfies the activation threshold.

10. The non-transitory computer-readable medium of claim 9, wherein the instructions to selectively adjust the activation threshold include instructions to perform one or more of: increasing a time-to-collision (TTC) value that specifies when to activate the alert, and an activation zone that specifies a proximity of the target path to the subject vehicle.

11. The non-transitory computer-readable medium of claim 9, wherein the instructions to selectively adjust the activation threshold include instructions to determine the curvature of the target path and adjusting the activation threshold when the curvature satisfies a defined radius for characterizing the target path as being curved.

12. The non-transitory computer-readable medium of claim 9, wherein the instructions to selectively adjust the activation threshold include instructions to determine that an instantaneous component of the target path satisfies an activation zone of the activation threshold and subsequently determine whether the target path includes the curvature in order to assess whether the activation zone is to be extended.

13. The non-transitory computer-readable medium of claim 9, wherein the instructions to identify the target include instructions to acquire sensor data about the surrounding environment of the subject vehicle, and identifying the target according to the sensor data, and
wherein the instructions to estimate the target path include instructions to use at least three observations of the target from the sensor data to determine a rate of turn for the target and infer a radius of the curvature.

14. A method comprising:
in response to identifying a target in a surrounding environment of a subject vehicle, estimating a target path of the target;
selectively adjusting an activation threshold for providing an alert according to a curvature of the target path; and
activating the alert in response to determining a hazard associated with a passenger exiting the subject vehicle into the target path according to whether the target path satisfies the activation threshold.

15. The method of claim 14, wherein selectively adjusting the activation threshold includes one or more of: increasing a time-to-collision (TTC) value that specifies when to activate the alert, and an activation zone that specifies a proximity of the target path to the subject vehicle.

16. The method of claim 14, wherein selectively adjusting the activation threshold includes determining the curvature of the target path and adjusting the activation threshold when the curvature satisfies a defined radius for characterizing the path as being curved.

17. The method of claim 14, wherein selectively adjusting the activation threshold includes determining that an instantaneous component of the target path satisfies an activation zone of the activation threshold and subsequently determining whether the target path includes the curvature in order to assess whether the activation zone is to be extended.

18. The method of claim 14, wherein identifying the target includes acquiring sensor data about the surrounding environment of the subject vehicle, and identifying the target according to the sensor data, and
wherein estimating the target path includes using at least three observations of the target from the sensor data to determine a rate of turn for the target and infer a radius of the curvature.

19. The method of claim 14, wherein the target is a moving object in the surrounding environment of the subject vehicle including one or more of: a nearby vehicle, a pedestrian, and a bicycle,
wherein estimating the target path includes computing the path from multiple observations of the vehicle at different points in time.

20. The method of claim 14, wherein activating the alert includes generating the alert as a safe exit alert including at least one of: an audible sound, a visual indicator, haptic feedback, and locking a door of the subject vehicle, and
wherein selectively adjusting the activation threshold improves safety of the passenger from exiting the subject vehicle into a path of the target.

* * * * *

UNITED STATES PATENT AND TRADEMARK OFFICE
CERTIFICATE OF CORRECTION

PATENT NO. : 11,351,998 B2
APPLICATION NO. : 16/822105
DATED : June 7, 2022
INVENTOR(S) : Joshua Goriesky, Nathaniel Sherrit and Ryo Takaki It is certified that error appears in the above-identified patent and that said Letters Patent is hereby corrected as shown below:

On the Title Page

Item [57], In the Abstract, replace "System, methods, and" with -- Systems, methods, and --.

In the Claims

In Claim 6, replace "observations of the vehicle" with -- observations of the subject vehicle --.

In Claim 16, replace "characterizing the path as" with -- characterizing the target path as --.

In Claim 19, replace "computing the path from" with -- computing the target path from --.

In Claim 19, replace "observations of the vehicle" with -- observations of the subject vehicle --.

Signed and Sealed this
Thirteenth Day of December, 2022

Katherine Kelly Vidal
*Director of the United States Patent and Trademark Office*